June 2, 1942.                E. J. WOOD                2,284,937
                            PIPE FITTING
              Filed Feb. 17, 1941            2 Sheets-Sheet 1

Inventor
Edwin J. Wood
J. S. Murray
Attorney

June 2, 1942.        E. J. WOOD        2,284,937
PIPE FITTING
Filed Feb. 17, 1941        2 Sheets-Sheet 2

Inventor
Edwin J. Wood
Attorney

Patented June 2, 1942

2,284,937

UNITED STATES PATENT OFFICE 2,284,937

PIPE FITTING

Edwin J. Wood, Detroit, Mich.

Application February 17, 1941, Serial No. 379,255

12 Claims. (Cl. 285—210)

This invention relates to pipe fittings and particularly pipe T's.

In many fluid systems and particularly in hot water systems of heating, it is necessary to provide both delivery and return ducts for handling the fluid flow required by heating or other appliances. The general practice has been to separately form said ducts, although they commonly lie in close mutual proximity.

In hot water radiator systems, it is usual and desirable to divert only a portion of the flow from a delivery main to each radiator and to discharge the return flow from the several radiators into a common return main.

An object of the invention is to provide partitioned pipe suited to handle both the delivery and return flow of fluids, and to provide a T particularly suited for use with such pipe and adapted to divert a predetermined portion of the main delivery flow, and to direct a fractional return flow into a return main.

Another object is to effect a definite and positive registration between the pipe partitions and those of the T fitting.

These and various other objects are attained by the construction hereinafter described and illustrated in the accompanying drawings wherein.

Figure 1:
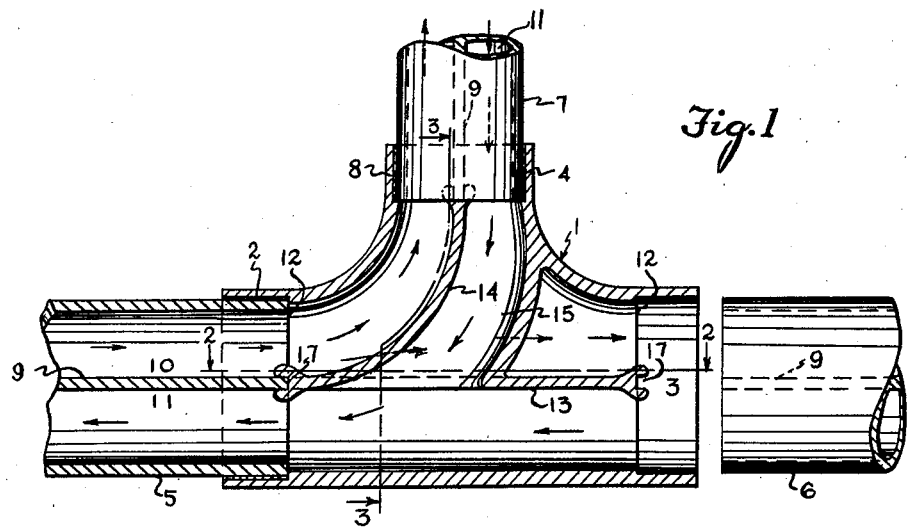
Fig. 1 is a sectional view of the improved T, taken in a plane determined by the axes of its three openings, showing pipes associated with said openings.
Figure 3:
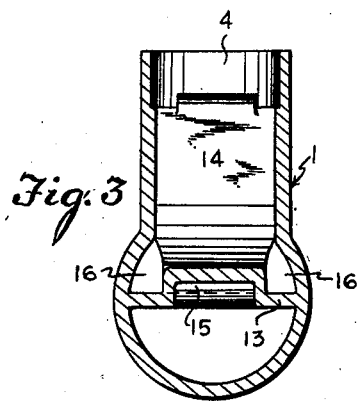
Fig. 3 is a transverse sectional view, taken on the line 3—3 of Fig. 1.
Figure 2:
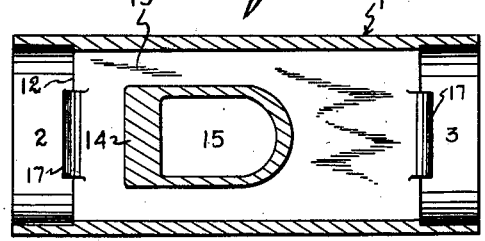
Fig. 2 is a longitudinal cross sectional view of the T taken on the line 2—2 of Fig. 1.
Figure 7:
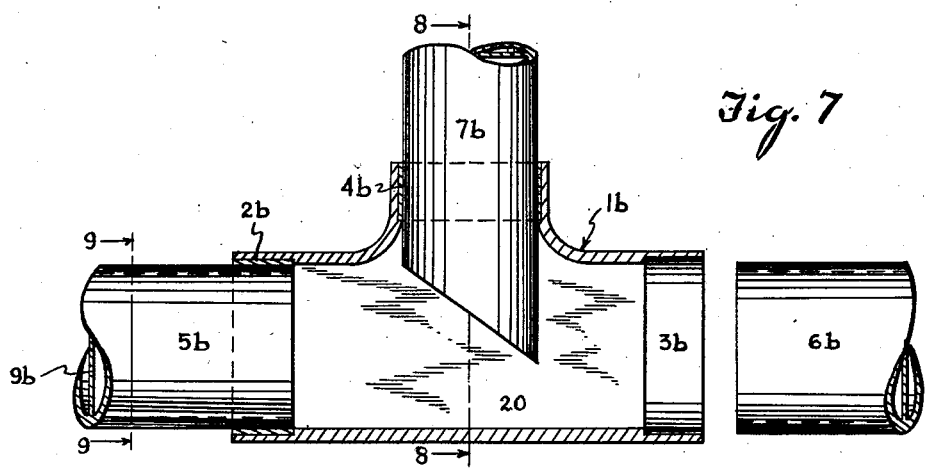
Fig. 7 is a view similar to Fig. 6, showing pipes engaged with the T.
Figure 6:
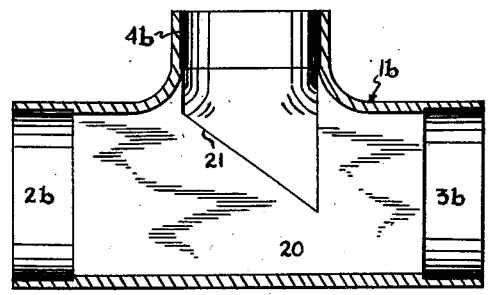
Fig. 6 is a sectional view of the T in a further modified form, the section being taken in a plane determined by the three axes of the T.
Figure 8:
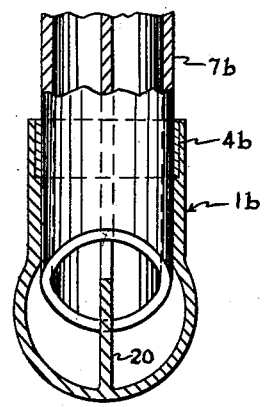
Fig. 8 is a transverse sectional view of the further modification, taken on the line 8—8 of Fig. 7.
Figure 9:
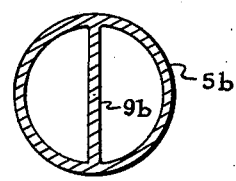
Fig. 9 is a cross sectional view of one of the pipes shown in Fig. 7, taken on the line 9—9 of Fig. 7.

In the construction shown by Figs. 1, 2, and 3, the reference character 1 designates a hollow fitting, preferably a casting, having opposed equal openings 2 and 3, and a relatively transverse opening 4 which will generally be smaller than the openings 2 and 3. Pipes 5, 6 and 7 are set into the openings 2, 3 and 4 and are retained and sealed therein in any desired manner, as by interposing a capillary ring 8 of solder between the inserted pipe ends and the fitting. Said pipes are diametrically partitioned, as indicated at 9, thus forming similar ducts 10 and 11 in each pipe.

Within the fitting 1, at suitable distances from its three ends, are annular shoulders 12 against which the ends of the pipes abut, and between such shoulders within the openings 2 and 3 there extends a partition 13 transverse to the fitting axes and bisecting both said openings. Merging into the partition 13 is a curved partition 14 transverse to the fitting axes and extending approximately from the shoulder 12 within the opening 4 and bisecting said opening. Integrally connected to the lower portion of the partition 14, at its convex side, is a duct 15 which downwardly extends one of the two passages formed in the opening 4 and which opens through the partition 13. The partition 14 is apertured at each side of the duct 15, as indicated at 16.

Preferably the ends of the partition 13 and the upper end of the partition 14 are enlarged and channeled as indicated at 17 to receive the partitions of the pipes 5, 6 and 7, thus definitely establishing rotative positions of said pipes in which their partitions properly register with those of the fitting.

As indicated by the arrows in Fig. 1, hot water delivered by the upper duct 10 of the pipe 5 flows in part through the openings 16 being thus delivered to the corresponding duct of the pipe 6. A predetermined portion of the hot water stream, however, is upwardly deflected by the partition 14, being thus delivered to the duct 10 of the pipe 7. Said duct discharges to any suitable appliance (not shown) as a radiator, and the relatively cold return flow from the latter is accommodated by the duct 11 of the pipe 7. Such return flow is carried by the duct 15 to the passage beneath the partition 13 which delivers it to the main return duct 11 of the pipe 5.

Figure 5:
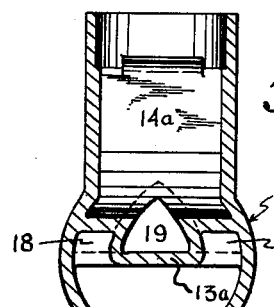
Fig. 5 is a transverse sectional view taken on the line 5—5 of Fig. 4.
Figure 4:
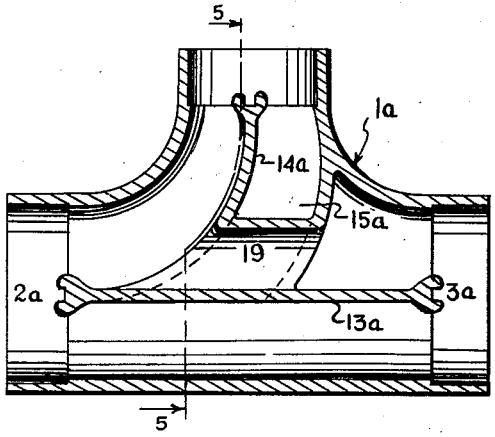
Fig. 4 is a sectional view similar to Fig. 1 but disclosing a modified construction.

In the modification illustrated by Figs. 4 and 5, the T fitting 1a has opposed openings 2a and 3a and partitions 13a and 14a as first described, and the partition 14a forms one wall of a duct 15a curved conformingly to said partition and serving to deliver a return flow from a radiator or the like to the passage below the partition 13a. The downward return flow, however, is split by passages 18 at opposite sides of a short duct 19 extending through the duct 15a just above the partition 13a and serving to allow a portion of the hot water stream to flow substantially straight through the fitting. Two openings in the partition 13a to accommodate return flow are formed at opposite sides of the duct 19, said openings thus extending the passages 18 through said partition.

In the modification shown in Figs. 6–9, the fitting 1b has opposed openings 2b and 3b and a relatively transverse opening 4b. Pipes 5b, 6b, and 7b engage in said openings and each of said pipes is diametrically partitioned, as indicated at 9b in the plane determined by the axes of the fitting. In said plane the fitting is formed with a partition 20 extending between the two opposed openings, and the partitions of said pipes substantially abut said fitting partition. It is preferred to form the latter with a recess 21 shaped to snugly receive the inner end portion of the pipe 7b and said end is cut obliquely to the pipe axis so that fluid flowing at one side of the fitting partition will in part be obstructed by the beveled pipe end and thus be directed into the passage formed in said pipe at the corresponding side of the pipe partition.

In any of its described forms, the invention substitutes a single line of pipe for two separate lines and thus accomplishes a considerable saving of material and a still greater saving of labor.

What I claim is:

1. A pipe T having two substantially opposed openings and an opening substantially transverse to the opposed openings, and having two separate passages connecting said opposed openings, and having two separate passages respectively connecting the respective first mentioned passages with said transverse opening.

2. The combination with a pipe T having two substantially opposed openings and an opening substantially transverse to the opposed openings, and having two separate passages connecting said opposed openings, of a pipe inserted in said third opening and having a partition forming two passages lengthwise of the pipe and respectively communicating with the respective separate passages of the fitting.

3. A pipe T having two substantially opposed openings and an opening substantially transverse to the axes of said openings, a partition forming two separate passages connecting the opposed openings, and a duct extending from the third opening and opening through said partition, said duct having a capacity less than that of the third opening.

4. A pipe T having two substantially opposed openings and an opening substantially transverse to the opposed openings, a partition substantially transverse to the axes of said openings forming two separate passages connecting the opposed openings, one adjacent to and the other remote from the transverse opening, a second partition extending from the first partition and dividing the transverse opening, and a duct formed conjointly with the second partition and connecting said remote passage with one of the divisions of the transverse opening.

5. A pipe T having two substantially opposed openings and an opening substantially transverse to the opposed openings, a partition substantially transverse to the axes of said openings, forming two separate passages connecting the opposed openings, forming two separate passages connecting the opposed openings, and a duct of less capacity than the transverse opening extending from the transverse opening to and opening through said partition, one of said passages being extended through said duct.

6. The combination with a pipe T having opposed openings and a relatively transverse opening, and having a partition extending between, and forming two passages connecting the opposed openings and disposed substantially in the axial plane of the three openings, of a pipe inserted in said transverse opening and formed with a partition extending substantially along the axis of said pipe, the pipe partition and fitting partition occupying substantially a common plane and having substantially mutually abutting relation.

7. The combination as set forth in claim 6, the fitting partition having an opening into which said pipe is fitted.

8. The combination with a pipe fitting and a pipe inserted in said fitting, the pipe and fitting being formed with registering partitions and one of said partitions having a terminal socket receiving an end of the other partition.

9. The combination with a pipe fitting having opposed openings and having a third opening between said opposed openings, and having a partition extending between the opposed openings and forming two passages connecting the opposed openings, of a pipe inserted in said third opening and having a partition forming two passages lengthwise of the pipe, the pipe partition and fitting partition abutting in a plane substantially common to said partitions.

10. The combination set forth in claim 9, the pipe being extended into the fitting and terminating between the opposed openings in an end beveled obliquely to the pipe in a plane substantially transverse to the fitting partition, the fitting partition being recessed to receive the pipe.

11. The combination with a pipe fitting and a pipe inserted in said fitting, the pipe and fitting being formed with registering partitions, one of said partitions forming a channel snugly accommodating the other partition.

12. A pipe fitting having two substantially opposed openings, a third opening, and a partition forming two passages between the opposed openings, one relatively close to and the other relatively remote from the third opening, and a duct extending from the third opening through said adjacent passage to said partition, and opening through the partition into said remote passage, said duct exteriorly affording a connection to the third opening from said adjacent passage.

EDWIN J. WOOD.